US006102557A

United States Patent [19]

Kaneda

[11] Patent Number: 6,102,557

[45] **Date of Patent: *Aug. 15, 2000**

[54] HEADLAMP WITH AUXILIARY REFLECTOR

[75] Inventor: Makoto Kaneda, Tokyo, Japan

[73] Assignee: Stanley Electric Co., Ltd., Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/039,648

[22] Filed: Mar. 16, 1998

[30] Foreign Application Priority Data

Mar. 21, 1997 [JP] Japan .................................... 9-068006

[51] Int. Cl.[7] ...................................................... B60Q 1/00

[52] U.S. Cl. .......................... 362/507; 362/516; 362/517; 362/518; 362/297; 362/346

[58] Field of Search .................................... 362/516, 517, 362/518, 297, 346, 507

[56] References Cited

U.S. PATENT DOCUMENTS

| | | | |
|---|---|---|---|
| 1,394,934 | 10/1921 | O'Neil | 362/516 |
| 4,772,987 | 9/1988 | Kretschmer et al. | 362/346 X |
| 4,800,468 | 1/1989 | Yokoyama | 362/518 |
| 4,914,747 | 4/1990 | Nino | 362/518 X |
| 4,918,580 | 4/1990 | Nino | 362/518 X |
| 5,008,781 | 4/1991 | Nino | 362/518 |
| 5,130,904 | 7/1992 | Ohshio et al. | 362/297 X |
| 5,373,430 | 12/1994 | McDermott | 362/346 X |
| 5,406,464 | 4/1995 | Saito | 362/518 |
| 5,599,085 | 2/1997 | Tabata et al. | 362/297 X |
| 5,671,995 | 9/1997 | Serizawa et al. | 362/517 X |

FOREIGN PATENT DOCUMENTS

| | | |
|---|---|---|
| 0269975 | 6/1988 | European Pat. Off. . |
| 2057246 | 5/1971 | France . |

*Primary Examiner*—Sandra O'Shea
*Assistant Examiner*—Ronald E. DelGizzi
*Attorney, Agent, or Firm*—Ostrolenk, Faber, Gerb & Soffen, LLP

[57] ABSTRACT

A headlamp wherein an auxiliary reflector is arranged at at least one of portions close to above, left or right ends of a main reflector providing an effective section of a reflecting mirror and outside a range that forms a light distribution characteristic. The auxiliary reflector reflects a light in a direction adjacent to a side opposite to a side at which the auxiliary reflector is arranged relative to the light distribution characteristic defined by the main reflector. The novel constitution allows a headlamp of this type, in which a light having a relatively large tilt angle from the optical axis has been conventionally prevented by the housing of the headlamp from being radiated, to effectively radiate such a light in a desired direction and in a necessary range.

4 Claims, 3 Drawing Sheets

HEADLAMP WITH AUXILIARY REFLECTOR

BACKGROUND OF THE INVENTION

1. Field of the Invention

The present invention generally relates to a headlamp for use on an automobile for example and, more particularly, to a headlamp comprising a reflecting mirror constituted by a free-curve reflector or a reflector known as a multi-reflector composed of a plurality of reflectors to form a light distribution characteristic by the reflector itself rather than by headlamp-lens cutting.

2. Background Art

Referring to FIG. 5, there is shown a prior-art headlamp 90 of the above-mentioned type by way of example of a multi-reflector. A reflecting mirror 91 of this headlamp 90 is constituted by a combination of an ineffective section 95 that does not reflect a light coming from a light source 92 and a main reflector 91*a* composed of a plurality of unit reflectors each providing an effective section that reflects the light coming from the light source 92. These unit reflectors have different orientations and light diffusion angles and are arranged on a rear portion of the reflecting mirror 91.

In the above-mentioned embodiment, a light distribution characteristic is provided by synthesizing the lights reflected from all unit reflectors. Therefore, in principle, a lens 93 need not be cut for obtaining the above-mentioned effect. This constitution provides an advantage that, if the surface of the lens 93 is tilted in agreement with vehicle contour, no distortion, such as a droop in both left and right ends of the light distribution characteristic, is caused. At the same time, this embodiment enhances the transparency of the lens 93 and the appearance of the headlamp 90 in its entirety.

However, in the above-mentioned prior-art headlamp 90, the light distribution characteristic is adjusted by the main reflector 91*a* composed of the plurality of the unit reflectors arranged on the rear portion of the headlamp 90. Consequently, the reflected light is blocked by a housing 94, thereby making it difficult to set a reflected light that travels in a direction largely diverging downward and sideways from the true front direction of the vehicle.

In addition, providing a large difference in reflected light travel direction between the adjacent unit reflectors forms a large difference in level between these adjacent unit reflectors. A light coming from the light source 92 and reflected from this large level difference is directed in a direction other than a desired direction, thereby causing a glare or the like. This makes it difficult to set a reflected light to travel in a direction largely diverging from the true front direction of the vehicle, resulting in a problem of making an area in front of and close to the vehicle darker, for example an area within five meters ahead of the vehicle.

SUMMARY OF THE INVENTION

It is therefore an object of the present invention to provide a headlamp comprising a reflecting mirror having an ineffective section and an effective section operating as a main reflector and forming a light distribution characteristic by this main reflector, wherein an auxiliary reflector is arranged at at least one portion outside a range that is close to the outer periphery of the main reflector and forms the light distribution characteristic, the auxiliary reflector reflecting a light in a direction adjacent to the side opposite to the side at which the auxiliary reflector is arranged relative to the light distribution characteristic formed by the main reflector.

It is another object of the present invention to provide a headlamp, wherein the main reflector is constituted by one of a free-curve reflector and a multi-reflector.

It is still another object of the present invention to provide a headlamp, wherein the multi-reflector is constituted by at least two or more unit reflectors.

BRIEF DESCRIPTION OF THE DRAWINGS

These and other objects and advantages of the present invention will become clear from the following description with reference to the accompanying drawings, wherein.

DETAILED DESCRIPTION OF THE PREFERRED EMBODIMENTS

Figure 1:
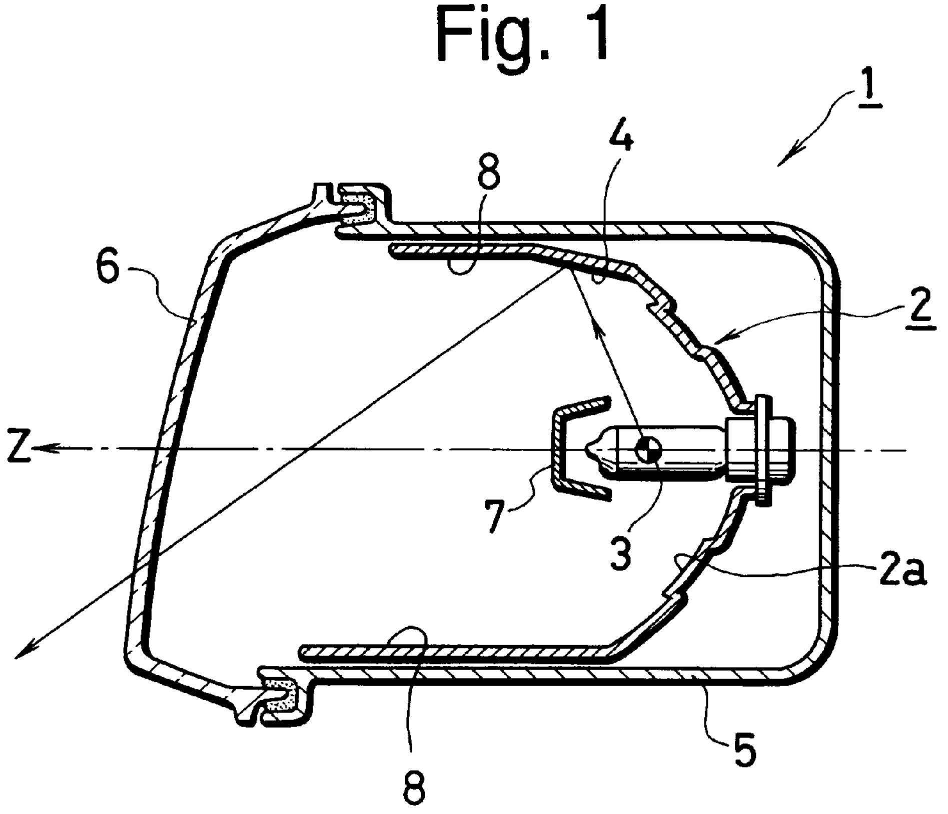
FIG. 1 is a vertical cross section illustrating a headlamp practiced as one preferred embodiment of the invention.

The present invention is described in detail hereunder with reference to embodiments shown in the accompanying drawings. Now, referring to FIG. 1, reference numeral 1 denotes a headlamp according to the present invention. The headlamp 1 has a reflecting mirror 2 provided at the rear side thereof with a main reflector 2*a* comprised of a plurality of unit reflectors operating as an effective section or a light reflecting section, reflecting mirror 2 also has, at the front side of headlamp an ineffective section 8 or a light non-reflecting section. The headlamp 1 is substantially the same as a conventional headlamp in that a light distribution characteristic is defined by a total of the reflected lights which are lights traveling from a light source 3 to the unit reflectors and reflected by the unit reflectors. It should be noted that FIG. 1 is a vertical cross section of the headlamp 1 mounted on a vehicle.

In the present invention, an auxiliary reflector 4 is arranged on the headlamp 1 in order to compensate a range in front of and close to the vehicle for example, the range being darker than the surroundings thereof. To be more specific, the auxiliary reflector 4 is arranged at a position close to the outer periphery of the main reflector 2*a* and opposite to the direction in which a light reflected from the auxiliary reflector 4 travels across the optical axis Z of the headlamp 1.

Namely, if the direction in which the reflected light is projected is downward in front of and close to the vehicle as described in the present preferred embodiment, the auxiliary reflector 4 is arranged in an upper portion of and close to the outer periphery of the main reflector 2*a* of the reflecting mirror 2. At the same time, the auxiliary reflector 4 is arranged at a position as far away as possible from the effective section in order to keep intact the light distribution characteristic defined by the main reflecting mirror 2.

Figure 2:
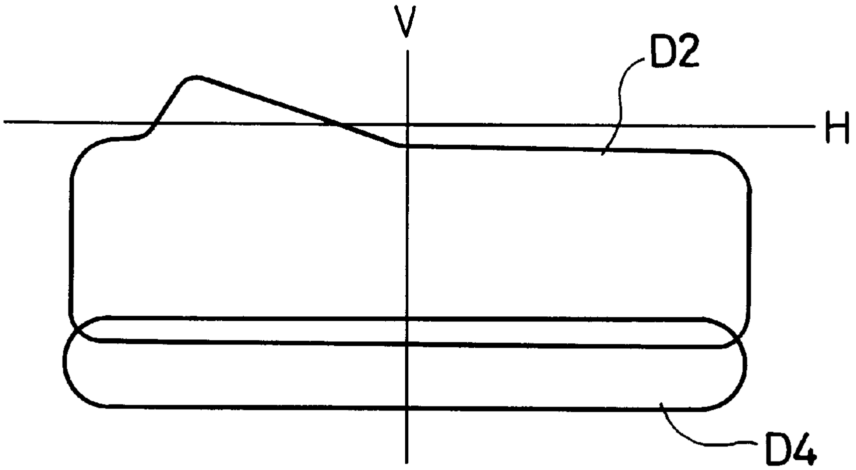
FIG. 2 is a diagram illustrating a light distribution characteristic of the preferred embodiment of FIG. 1.

FIG. 2 shows a relationship between a light distribution characteristic D2 defined by the main reflector 2*a* and an auxiliary light distribution characteristic D4 defined by the auxiliary reflector 4. The auxiliary light distribution characteristic D4 is located below and adjacent to the light distribution characteristic D2. This relationship indicates that the brightness in a desired area in front of and close to the vehicle is enhanced.

Thus constituted, the headlamp 1 according to the present invention makes a light reflected from the auxiliary reflector 4 traverse from an upside of a housing 5 to a downside thereof for example, transmit through a lens 6, and radiate outside the headlamp because the auxiliary reflector 4 is arranged at the position across the direction in which radiation of the light is intended relative to the optical axis Z. Consequently, the reflected light is not blocked any more by the housing 5 and therefore the tilt angle of the reflected light from the optical axis Z can be taken relatively large, thereby fully illuminating such a position as in front of and close to the vehicle, which it has been conventionally difficult to fully illuminate by a multi-reflector.

In addition, because the auxiliary reflector 4 is arranged outside the range of the main reflector 2*a*, the light coming from the light source 3 and reaching the auxiliary reflector 4, which has been conventionally blocked by a hood 7 for example as a useless light, is also made available. This enhances the availability of the light coming from the light source 3, thereby increasing the effective light quantity of the headlamp 1.

At the same time, because the auxiliary reflector 4 is positioned outside the range of the main reflector 2*a*, the light distribution characteristic D2 of the light reflected from the main reflector 2*a* is not substantially changed. Therefore, if a radiation angle of the light distribution characteristic D2 of the main reflector 2*a* is made relatively wider for example, no reduction in light quantity results.

Figure 3:
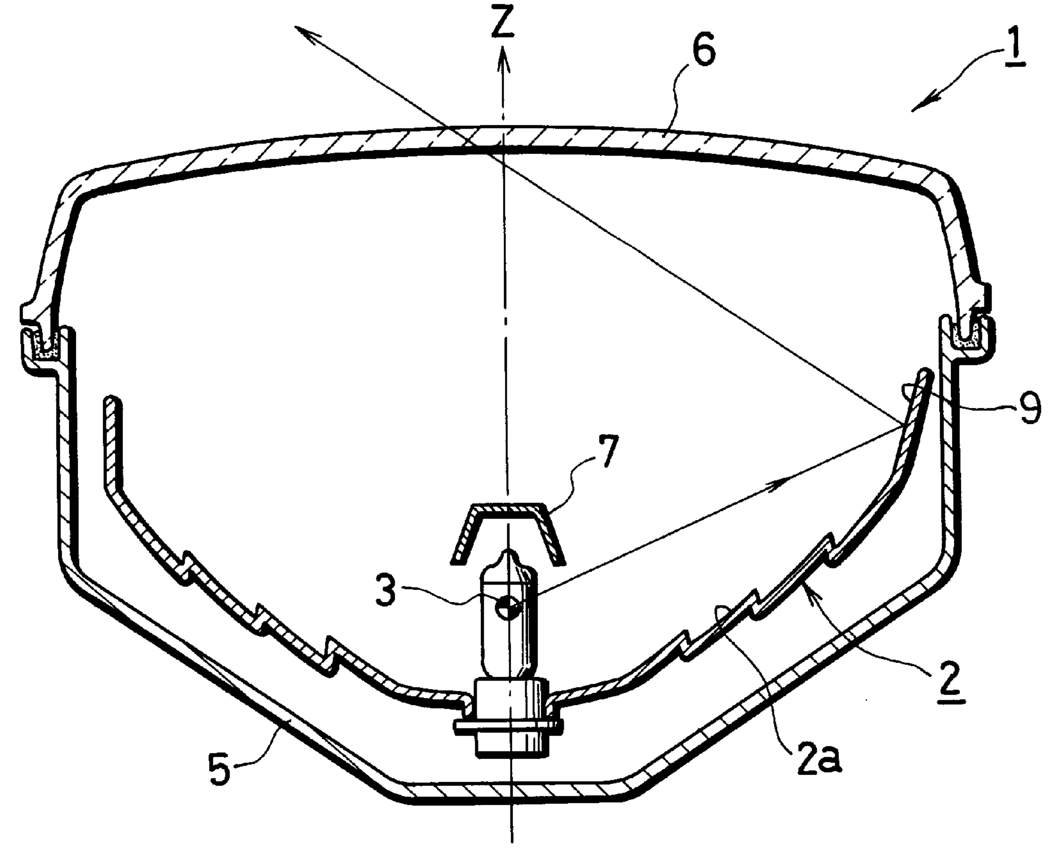
FIG. 3 is a horizontal cross section illustrating a headlamp practiced as another preferred embodiment of the invention.

Referring to FIG. 3, there is shown a headlamp practiced as another preferred embodiment of the present invention. In the preceding preferred embodiment shown in FIG. 1, the auxiliary reflector 4 having an angle in the vertical direction relative to the optical axis Z is provided to enhance illuminance of an area in front of and close to the vehicle. The preferred embodiment shown in FIG. 3 is provided with an auxiliary reflector 9 having an angle in the horizontal direction relative to the optical axis Z. It should be noted that FIG. 3 shows a horizontal cross section illustrating a headlamp 1 mounted on a vehicle.

If the vehicle travels in a left-hand traffic region, it is desired that a wider light radiation angle be provided on the left-side of the vehicle than on the right-side to facilitate the recognition of road signs and pedestrians. Therefore, in the preferred embodiment shown in FIG. 3, the auxiliary reflector 9 is arranged on the right side in the headlamp 1 relative to the true front direction of the vehicle. The light reflected from this auxiliary reflector 9 traverses the optical axis Z as with the preferred embodiment shown in FIG. 1 to travel in the left-side direction.

Figure 4:
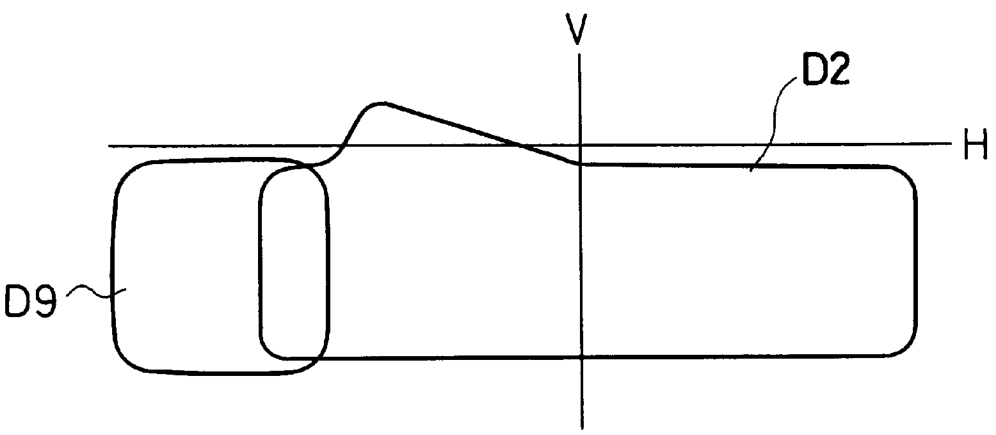
FIG. 4 is a diagram illustrating a light distribution characteristic of the preferred embodiment of FIG. 3.
Figure 5:
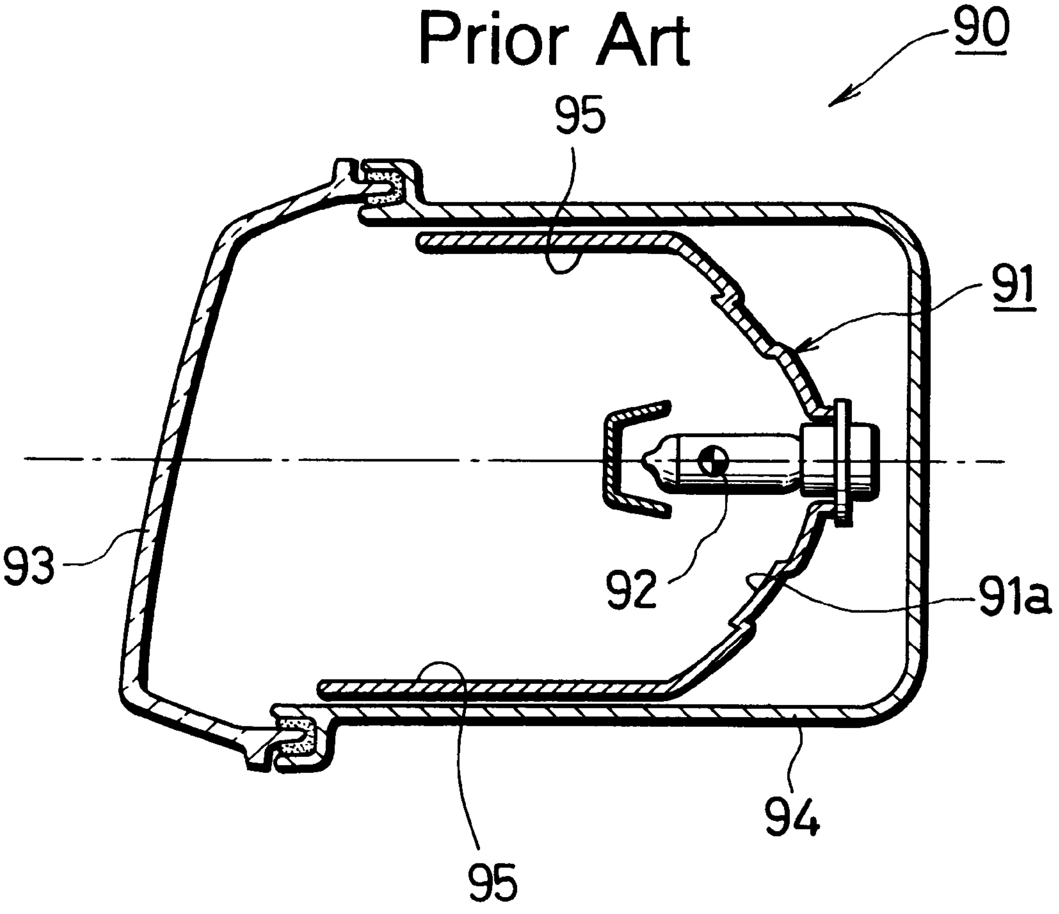
Fig. 5 Prior Art
FIG. 5 is a vertical cross section illustrating a prior-art headlamp.

In the preferred embodiment shown in FIG. 3, the light reflected from the auxiliary reflector 9 forms an auxiliary light distribution characteristic D9 adjacent to the light distribution characteristic D2 formed by the main reflector 2*a* as shown in FIG. 4. As indicated by the auxiliary light distribution characteristic D9, a wider light radiation angle is provided on the left side than on the right side, thereby enhancing visibility on the left side of the vehicle moving forward, and facilitating the recognition of road signs and pedestrians. It will be apparent that, in a right-hand traffic region, the auxiliary reflector 9 may be arranged to the left of the main reflector 2*a*.

It should be noted that the present invention is not restricted to the above-mentioned two preferred embodiments. For example, the auxiliary reflectors may be arranged above and on the right side of the main reflector 2*a* to radiate light to an area in front of and close to the vehicle and to a left-side area thereof at the same time. Further, the auxiliary reflectors may be arranged at three positions of above, right, and left to the main reflector 2*a* to provide a total light distribution characteristic relatively wide in downward, left-side, and right-side areas, such a light distribution characteristic being required by a fog light for example.

As described, the present invention can provide an auxiliary reflector on a headlamp in which it has been conventionally difficult, due to the restriction imposed by a housing of the headlamp for example, to set a radiated light that is tilted with respect to the optical axis. According to the present invention, this auxiliary reflector is arranged at a position in the reflector opposite to the desired light radiation direction with the optical axis in between. This novel constitution enhances the conventionally insufficient illuminance in an area in front of and close to the vehicle, thereby significantly enhancing the performance of the headlamp.

Further, the arrangement of the auxiliary reflector in an area outside the range by which the main light distribution characteristic is formed utilizes a conventionally useless light coming from the light source without adversely affecting the main light distribution characteristic, thereby enhancing the illuminance of a desired area. Thus, the novel constitution also enhances luminous flux availability to realize a headlamp further enhanced in brightness based on the synthesized light quantity, thereby significantly improving the performance of the headlamp.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. A headlamp comprising:

a housing;

a reflector disposed in said housing, said reflector including a main reflector and an auxiliary reflector;

a light source disposed in said housing so that said light source is effective to shine light on said reflector; and a lens disposed in front of said light source; wherein said main reflector is disposed circumferentially around said light source and is designed to produce a main light distribution characteristic;

said auxiliary reflector is designed to produce an auxiliary light distribution characteristic distinct from said main light distribution characteristic; and said auxiliary reflector is disposed adjacent to, continuous with, and fixed to an upper portion of said main reflector.

2. The headlamp as claimed in claim 1 wherein said reflector has a focal point and said light source is disposed at said focal point.

3. The headlamp as claimed in claim 1 further comprising a hood disposed between said light source and said lens.

4. The headlamp as claimed in claim 1 wherein said housing joins to said lens whereby said lens becomes a portion of a said housing.

* * * * *